(12) United States Patent
Kim

(10) Patent No.: US 8,925,072 B2
(45) Date of Patent: Dec. 30, 2014

(54) UNLOCKING SCHEMES

(71) Applicant: University of Seoul Industry Cooperation Foundation, Seoul (KR)

(72) Inventor: Jin Suk Kim, Seoul (KR)

(73) Assignee: University of Seoul Industry Cooperation Foundation (KR)

( * ) Notice: Subject to any disclaimer, the term of this patent is extended or adjusted under 35 U.S.C. 154(b) by 43 days.

(21) Appl. No.: 13/755,128

(22) Filed: Jan. 31, 2013

(65) Prior Publication Data
US 2013/0198837 A1   Aug. 1, 2013

(30) Foreign Application Priority Data
Feb. 1, 2012   (KR) .......................... 10-2012-0010332

(51) Int. Cl.
*G06F 12/00* (2006.01)
*G06F 12/14* (2006.01)
*G06F 7/04* (2006.01)
*G06F 21/36* (2013.01)
*G06F 11/30* (2006.01)
*H04N 7/167* (2011.01)

(52) U.S. Cl.
CPC ..................................... *G06F 21/36* (2013.01)
USPC ............... 726/19; 726/17; 713/189; 713/194; 380/200

(58) Field of Classification Search
CPC ......... G06F 21/31; G06F 21/23; G06F 21/34; G06F 21/36
USPC .......................................................... 726/19
See application file for complete search history.

(56) References Cited

U.S. PATENT DOCUMENTS

2001/0024521 A1    9/2001  Anderson
2012/0009896 A1*   1/2012  Bandyopadhyay et al. .. 455/411

FOREIGN PATENT DOCUMENTS

KR   1020090065766   6/2009
KR   1020120038777   4/2012

* cited by examiner

*Primary Examiner* — Evans Desrosiers
(74) *Attorney, Agent, or Firm* — Cantor Colburn LLP

(57) ABSTRACT

An end device may include a camera configured to capture an image of an object, a touch screen configured to receive a touch input and a processor configured to determine to unlock the end device based, at least in part, on the image of the object and the touch input.

19 Claims, 9 Drawing Sheets

UNLOCKING SCHEMES

CROSS-REFERENCE TO RELATED PATENT APPLICATION

This application claims priority from the Korean Patent Application No. 10-2012-0010332, filed on Feb. 1, 2012 in the Korean Intellectual Property Office, the entire disclosure of which is incorporated herein by reference in its entirety.

FIELD

Example embodiments broadly relate to a method and an apparatus for providing an unlocking scheme based on a touch input with enhanced securities and interests.

BACKGROUND

Touch-sensitive displays (also known as "touch screens" or "touchscreens") are well known in the art. Touch screens are used in many electronic devices to display graphics and text, and to provide a user interface through which a user may interact with the devices. Touch screens are becoming more popular for use as displays and as user input devices on portable devices, such as mobile telephones and personal digital assistants (PDAs). The portable devices may be locked upon satisfaction of predefined lock conditions, such as upon manual locking by a user, and have to be unlocked in order to be used again. The portable devices with touch screens may be unlocked by any of several well-known unlocking procedures, such as pressing a predefined set of buttons (simultaneously or sequentially) or entering a code or password.

SUMMARY

According to an aspect of example embodiments, there is provided an end device including a camera configured to capture an image of an object; a touch screen configured to receive a touch input; and a processor configured to determine to unlock the end device based, at least in part, on the image of the object and the touch input.

The captured image may be displayed on the touch screen, and the touch input may be received while the captured image is displayed on the touch screen.

The captured image may be displayed on the touch screen for a predetermined time and, then, the displayed image may be removed from the touch screen, and the touch input may be received after the displayed image is removed from the touch screen.

The processor may comprise: a touch input recognition unit configured to recognize a trace of the touch input; a boundary detection unit configured to detect a first boundary of the object from the image of the object; a similarity calculation unit configured to calculate a first similarity between the trace of the touch input and the first boundary of the object; and a control unit configured to determine to unlock the end device based, at least in part, on the first similarity.

The end device may further comprise: a memory configured to store at least one image of the object. The boundary detection unit may be further configured to detect a second boundary of the object from the at least one image stored in the memory, similarity calculation unit may be further configured to calculate a second similarity between the first boundary and the second boundary, and the control unit may determine to unlock the end device further based, at least in part, on the second similarity.

The processor may comprise: a texture recognition unit configured to recognize a first texture of the object from the captured image and a second texture of the object from the at least one image stored in the memory. The similarity calculation unit may be further configured to calculate a third similarity between the first texture and the second texture, and the control unit may determine to unlock the end device further based, at least in part, on the third similarity.

Each of the first texture and the second texture may include at least one of a color of the object and a pattern of the object.

The end device may further comprise: a memory configured to store at least one image of the object and at least one touch input associated with the object. The processor may comprise: a similarity calculation unit configured to calculate a fourth similarity between the received touch input and the at least one touch input stored in the memory and a fifth similarity between the captured image and the at least one image stored in the memory; and a control unit configured to determine to unlock the end device based, at least in part, on the fourth similarity and the fifth similarity.

The similarity calculation unit may calculate the fourth similarity based, at least in part, on a trace of the received touch input and a trace of the at least one touch input stored in the memory, and the similarity calculation unit may calculate the fifth similarity based, at least in part, on a texture of the object.

The end device may further comprise: a memory configured to store an information regarding an unlock permission location. The processor may comprise: a location information obtaining unit configured to obtain a location information of the end device. The processor may determine to unlock the end device further based, at least in part, on the location information of the end device and the information regarding the unlock permission location.

The processor may determine to unlock the end device if the location information of the end device falls within a tolerance range from the unlock permission location.

The end device may further comprise: a memory configured to store a password. The processor may comprise: a numeral image display unit configured to display, on the touch screen, a numeral image including a plurality of numerals; a numeral recognition unit configured to recognize, based at least in part on the touch input, at least one numeral selected on the numeral image; and a control unit configured to determine whether the at least one recognized numeral is identical to the password and determine to unlock the end device.

The captured image of the object may be displayed on the touch screen, and the numeral image may be overlaid on the captured image.

The numeral image display unit may be further configured to select the numeral image from a plurality of numeral images depending on a kind of the object.

The object may have thereon at least one numeral, and the numeral image may be generated based on the captured image of the object.

The captured image may include at least one character, and the end device may further comprise: a memory configured to store a password. The processor may comprise: a character reader configured to read at least one character selected on the captured image; and a control unit configured to determine whether the at least one character read by the character reader is identical to the password and determine to unlock the end device.

The captured image may include a keyboard image.

According to another aspect of example embodiments, a method performed under control of an end device comprises: capturing an image of an object; receiving a touch input; and determining to unlock the end device based, at least in part, on the image of the object and the touch input.

According to another aspect of example embodiments, there is provided a method of providing computer-executable instructions that cause an end device to perform a method including capturing an image of an object; receiving a touch input; and determining to unlock the end device based, at least in part, on the image of the object and the touch input.

According to another aspect of example embodiments, there is provided a non-transitory computer-readable storage medium having stored thereon computer-executable instructions that, in response to execution, cause an end device to perform operations including capturing an image of an object; receiving a touch input; and determining to unlock the end device based, at least in part, on the image of the object and the touch input.

BRIEF DESCRIPTION OF THE DRAWINGS

Non-limiting and non-exhaustive example embodiments will be described in conjunction with the accompanying drawings. Understanding that these drawings depict only example embodiments and are, therefore, not intended to limit its scope, the example embodiments will be described with specificity and detail taken in conjunction with the accompanying drawings, in which.

DETAILED DESCRIPTION

Figure 1:
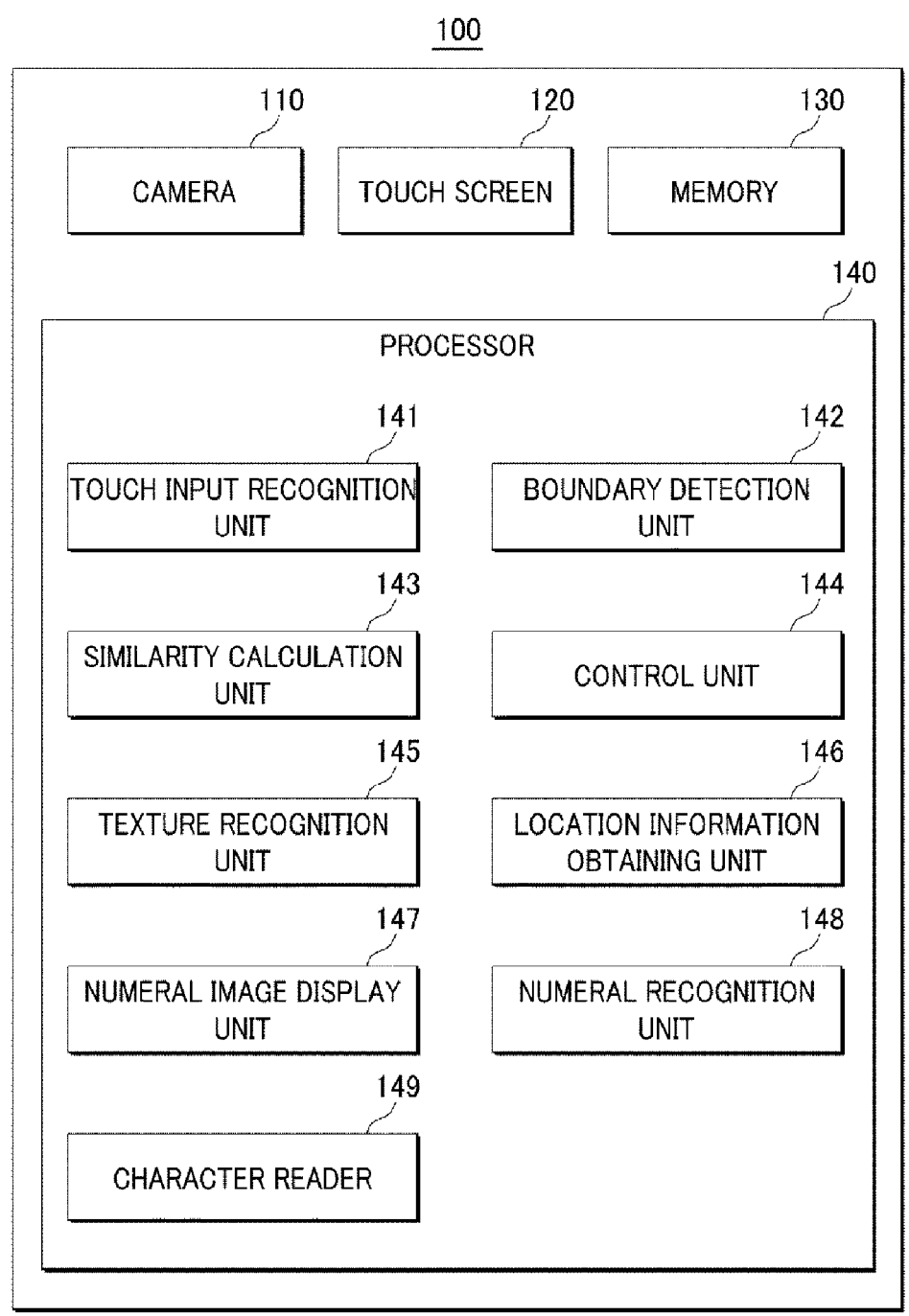
FIG. 1 shows a schematic block diagram illustrating an architecture for an end device, in accordance with example embodiments described herein.

Hereinafter, some embodiments will be described in detail. It is to be understood that the following description is given only for the purpose of illustration and is not to be taken in a limiting sense. The scope of the invention is not intended to be limited by the embodiments described hereinafter with reference to the accompanying drawings, but is intended to be limited only by the appended claims and equivalents thereof.

It is also to be understood that in the following description of embodiments any direct connection or coupling between functional blocks, devices, components, circuit elements or other physical or functional units shown in the drawings or described herein could also be implemented by an indirect connection or coupling, i.e. a connection or coupling comprising one or more intervening elements. Furthermore, it should be appreciated that functional blocks or units shown in the drawings may be implemented as separate circuits in some embodiments, but may also be fully or partially implemented in a common circuit in other embodiments. In other words, the provision of functional blocks in the drawings is intended to give a clear understanding of the various functions performed, but is not to be construed as indicating that the corresponding functions are necessarily implemented in physically separate entities.

It is further to be understood that any connection which is described as being wire-based in the following specification may also be implemented as a wireless communication connection unless noted to the contrary.

The features of the various embodiments described herein may be combined with each other unless specifically noted otherwise. On the other hand, describing an embodiment with a plurality of features is not to be construed as indicating that all those features are necessary for practicing the present invention, as other embodiments may comprise less features and/or alternative features.

In some examples, an image captured by an end device as well as a touch input made by a user of the end device may be used in order to unlock the end device which is in a lock state. By way of example, but not limited to, the end device may capture an image of a certain object (e.g., a wallet, a watch, a key, a cell phone, a pen and so forth) around the end device. While viewing the object around the end device, the user of the end device may draw a boundary of the object through a touch input on a touch screen. Then, the end device may recognize a trace of the touch input made by the user and the end device may detect the boundary of the object from the captured image by using any one of well-known boundary detection schemes. Based on both of the trace of the touch input and the boundary of the object, the end device may determine whether the trace of the touch input and the boundary of the object are similar to each other. If a similarity therebetween is the same as or higher than a predetermined value, the end device may be unlocked.

FIG. 1 shows a schematic block diagram illustrating an architecture for an end device, in accordance with example embodiments described herein. As depicted in FIG. 1, an end device 100 may include a camera 110, a touch screen 120, a memory 130 and a processor 140. Further, processor 140 may include a touch input recognition unit 141, a boundary detection unit 142, a similarity calculation unit 143, a control unit 144, a texture recognition unit 145, a location information obtaining unit 146, a numeral image display unit 147, a numeral recognition unit 148 and a character reader 149. It will be understood by those skilled in the art that each function and/or operation of the components may be implemented, individually and/or collectively, by a wide range of hardware, software, firmware, or virtually any combination thereof. In that regard, one or more of touch input recognition unit 141, boundary detection unit 142, similarity calculation unit 143, control unit 144, texture recognition unit 145, location information obtaining unit 146, numeral image display unit 147, numeral recognition unit 148 and character reader 149 may be implemented in an application executable on end device 100 and the application may be installed on end device 100 upon downloading the application from a predetermined website or an on-line application store.

End device 100 may be any portable electronic device, including but not limited to a handheld computer, a tablet computer, a mobile phone, a media player, a smart phone, a personal digital assistant (PDA), or the like.

Camera 110 may capture an image of a certain object around end device 100. Touch screen 120 may receive a touch input from a user of end device 100 based on haptic and/or tactile touch input. The user may make touch input to touch screen 120 using any suitable object or appendage, such as a stylus, finger, and so forth. Touch screen 120 may have a touch-sensitive surface that receives the touch input. Touch screen 120 may receive the touch input to the touch-sensitive surface and converts the touch input into interaction with user-interface objects that are displayed on touch screen 120. By way of example, but not limited to, touch screen 120 may use liquid crystal display (LCD) technology, or light emitting polymer display (LPD) technology.

In some embodiments, in order to enhance securities for end device 100, the user of end device 100 may previously capture at least one image of the object by camera 110 and memory 130 may store the at least one image of the object that was captured by camera 110 and at least one touch input that was made by the user in association with the image of the object. For determining to unlock end device 100, processor 140 may use the at least one image of the object and the at least one touch input which are previously stored in memory 130. In some other embodiments, memory 130 may store a password. Processor 140 may unlock end device 100 based on the touch input from the user and the password previously stored in memory 130.

By way of example, but not limited to, memory 130 may include high speed random access memory, non-volatile memory such as one or more magnetic disk storage devices, flash memory devices, or other non-volatile solid state memory devices, network attached storage accessed via a communications network such as the Internet, intranet(s), Local Area Networks (LANs), Wide Local Area Networks (WLANs), Storage Area Networks (SANs) and the like, or any suitable combination thereof.

Processor 140 may determine to unlock end device 100 based, at least in part, on the image currently captured by camera 110 and the touch input currently received by touch screen 120. Touch input recognition unit 141 may recognize a trace of the touch input. Touch input recognition unit 141 may recognize the trace of the touch input by using any of multiple touch sensitivity technologies, including but not limited to capacitive, resistive, infrared, and surface acoustic wave technologies, as well as other proximity sensor arrays or other elements for determining one or more points of contact with touch screen 120.

In some embodiments, boundary detection unit 142 may detect a first boundary of the object from the image currently captured by camera 110. The first boundary of the object can be detected by using any one of well-known boundary detecting schemes. Similarity calculating unit 143 may calculate a first similarity between the trace of the touch input, which is recognized by touch input recognition unit 141 and the first boundary of the object, which is detected by boundary detection unit 142. Control unit 144 may determine to unlock end device 100 based, at least in part, on the first similarity calculated by similarity calculating unit 143. For example, control unit 144 may compare the first similarity with a first predetermined value stored in memory 130 and if the first similarity is the same as or higher than the first predetermined value, control unit 144 may determine to unlock end device 100. The first predetermined value may be a default value or a variable value set according to security requirement for end device 100.

In some embodiments, in order to enhance securities for end device 100, processor 140 may consider a second similarity in addition to the first similarity. As stated above, stored in memory 130 is at least one image of the object that was previously captured by camera 110 and the object is the same object that is currently captured by camera 110. Boundary detection unit 142 may further detect a second boundary of the object from the image previously stored in memory 130. Similarity calculating unit 143 may further calculate the second similarity between the first boundary detected from the image currently captured by camera 110 and the second boundary detected from the image previously stored in memory 130. Control unit 144 may determine to unlock end device 100 further based, at least in part, on the second similarity in addition to the first similarity. For example, if the first similarity is the same as or higher than the first predetermined value, control unit 144 may further compare the second similarity with a second predetermined value stored in memory 130 and if the second similarity is the same as or higher than the second predetermined value, control unit 144 may determine to unlock end device 100. The second predetermined value may be the same as or different from the first predetermined value.

In some other embodiments, in order to enhance securities for end device 100, processor 140 may consider a third similarity in addition to the first similarity and/or the second similarity. As stated above, stored in memory 130 is at least one image of the object that was previously captured by camera 110 and the object is the same object that is currently captured by camera 110. Texture recognition unit 145 may recognize a first texture of the object from the image currently captured by camera 110 and a second texture of the object from the image previously stored in memory 130. By way of example, but not limited to, the first texture of the object and the second texture of the object may include at least one of a color of the object and a pattern of the object. Texture recognition unit 145 may recognize the first texture and the second texture by using any one of well-known pattern recognition schemes and/or well-known color recognition schemes.

Similarity calculating unit 143 may further calculate the third similarity between the first texture of the object and the second texture of the object. Control unit 144 may determine to unlock end device 100 further based, at least in part, on the third similarity in addition to the first similarity and/or the second similarity. For example, control unit 144 may compare the third similarity with a third predetermined value stored in memory 130 and if the third similarity is the same as or higher than the third predetermined value, control unit 144 may determine to unlock end device 100. The third predetermined value may be the same as or different from at least one of the first predetermined value and the second predetermined value.

In some other embodiments, in order to enhance securities for end device 100, processor 140 may determine to unlock end device 100 further based on a fourth similarity and a fifth similarity in addition to at least one of the first similarity, second similarity and third similarity. As stated above, stored in memory 130 is at least one image of the object that was previously captured by camera 110 and at least one touch input that was previously made in association with the object. Similarity calculating unit 143 may further calculate the fourth similarity between the touch input currently received by touch screen 120 and the at least one touch input previously stored in memory 130. By way of example, but not limited to, the touch input previously stored in memory 130 may have a certain trace that was previously made by the user of end device 100, such as a star-shaped trace, a circle-shaped trance or a rectangular-shaped trace. Similarity calculating unit 143 may calculate the fourth similarity by comparing the trace of the touch input currently recognized by touch input recognition unit 141 with the certain trace previously stored in memory 130.

Further, similarity calculating unit 143 may further calculate the fifth similarity between the image currently captured by camera 110 and the image previously stored in memory 130. By way of example, but not limited to, similarity calculating unit 143 may calculate the fifth similarity by comparing at least one of a boundary, pattern and color of the object included the image currently captured by camera 110 with at least one of a boundary, pattern and color of the object included the image previously stored in memory 130.

Control unit 144 may determine to unlock end device 100 based, at least in part, on the fourth similarity and the fifth similarity. By way of example, but not limited to, control unit 144 may compare each of the fourth similarity and the fifth similarity with each of a fourth predetermined value and a fifth predetermined value stored in memory 130. If the fourth similarity is the same as or higher than the fourth predetermined value and the fifth similarity is the same as or higher than the fifth predetermined value, control unit 144 may determine to unlock end device 100. Although control unit 144 has been described to determine to unlock end device 100 based on the fourth similarity and the fifth similarity in addition to at least one of the first similarity, second similarity and third similarity, it will be apparent to those skilled in the art that control unit 144 may determine to unlock end device 100 based on the fourth similarity and the fifth similarity irrespective of the first similarity, second similarity and third similarity.

In some other embodiments, in order to enhance securities for end device 100, processor 140 may determine to unlock end device 100 based on location information of end device 100 in addition to at least one of the first similarity, second similarity, third similarity, fourth similarity and fifth similarity. Location information obtaining unit 146 may obtain location information of end device 100. By way of example, but not limited to, location information obtaining unit 146 may obtain location information of end device 100 by using any one of well-known location information obtaining schemes using a global positioning system (GPS), a third generation (3G) and/or fourth generation (4G) mobile telecommunication network system.

Control unit 144 may determine to unlock end device 100 based, at least in part, on the location information of end device 100. In some embodiments, control unit 144 may check if the current location information of end device 100 falls within a tolerance range from a predetermined unlock permission location on which end device 100 is permitted to be unlocked. The predetermined unlock permission location may be set by the user of end device 100 and previously stored in memory 130.

In some other embodiments, numeral image display unit 147 may display a numeral image including multiple numerals on touch screen 120. The image currently captured by camera 110 may be displayed on touch screen 120 and numeral image display unit 147 may overlay the numeral image on the currently captured image. Multiple numeral images may be previously stored in memory 130. Numeral image display unit 147 may select one numeral image from among the multiple numeral images depending on a kind of the object included in the image captured by camera 110 and display the selected numeral image on touch screen 120. By way of example, but not limited to, if camera 110 captures an image of a safe, numeral image display unit 147 may select a safe dial image and display the safe dial image on touch screen 120.

Numeral recognition unit 148 may recognize at least one numeral selected by a touch input to the numeral image displayed by numeral image display unit 147. By way of example, but not limited to, numeral recognition unit 148 may recognize the numeral selected by the touch input to the numeral image by using any one of well-known character reading schemes such as an optical character reading scheme. Control unit 144 may determine whether the at least one recognized numeral is identical to the password stored in memory 130. If the recognized numeral is identical to the password, control unit 144 may determine to unlock end device 100.

In some other embodiments, camera 110 may capture an image of an object which includes at least one character and the image may be displayed on touch screen 120. The at least one character may be selected by a touch input to the image displayed on touch screen 120 and character reader 149 may read the at least one character. The at least one character selected by the touch input to the displayed image may be read by using any one of well-known character reading schemes such as an optical character reading scheme. By way of example, but not limited to, the captured image may be a keyboard image including multiple characters. Character reader 149 may read at least one character selected by the touch input to the image such as a keyboard image. Control unit 144 may determine whether the at least one character read by character reader 149 is identical to the password stored in memory 130. If the character read by character reader 149 is identical to the password, control unit 144 may determine to unlock end device 100.

Figure 2:
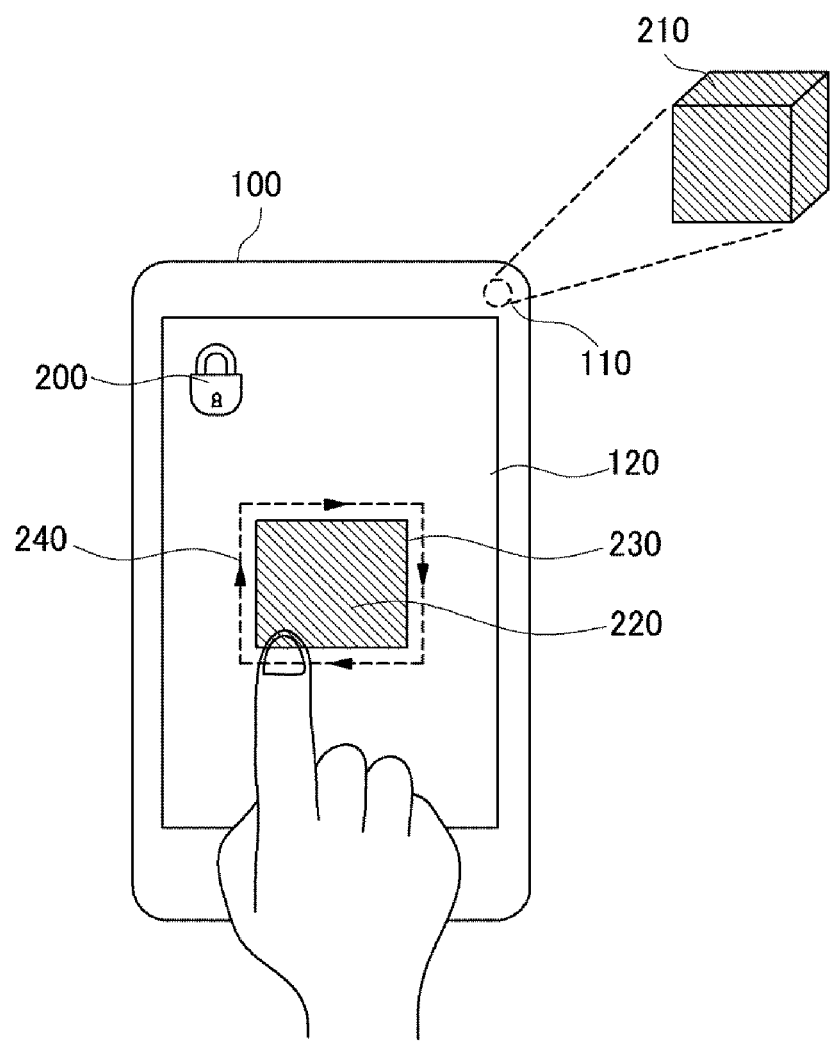
FIG. 2 schematically shows an illustrative example of performing an unlocking scheme on the end device of FIG. 1.

FIG. 2 schematically shows an illustrative example of performing an unlocking scheme on the end device of FIG. 1. As illustrated in FIG. 2, end device 100 as illustrated in FIG. 1 is in a lock state and a lock state image 200 may be displayed on touch screen 120 of end device 100. Camera 110 of end device 100 may capture an image 220 of an object 210. Captured image 220 of object 210 may be displayed on touch screen 120 of end device 100.

A user of end device 100 may make a touch input to touch screen 120 along a boundary 230 of captured image 220. Processor 140 of end device 100 may recognize a trace 240 of the touch input. Further, processor 140 may detect boundary 230 of object 210 from captured image 220. Then, processor 140 may calculate a similarity between trace 240 of the touch input and boundary 230 of object 210. For example, processor 140 may calculate each area of trace 240 of the touch input and boundary 230 of object 210, and then, compare the area of trace 240 of the touch input with the area of boundary 230 of object 210. Processor 140 may determine whether the calculated similarity is the same as or higher than a predetermined value. If the calculated similarity is same as or higher than the predetermined value, processor 140 may determine to unlock end device 100.

Figure 3:
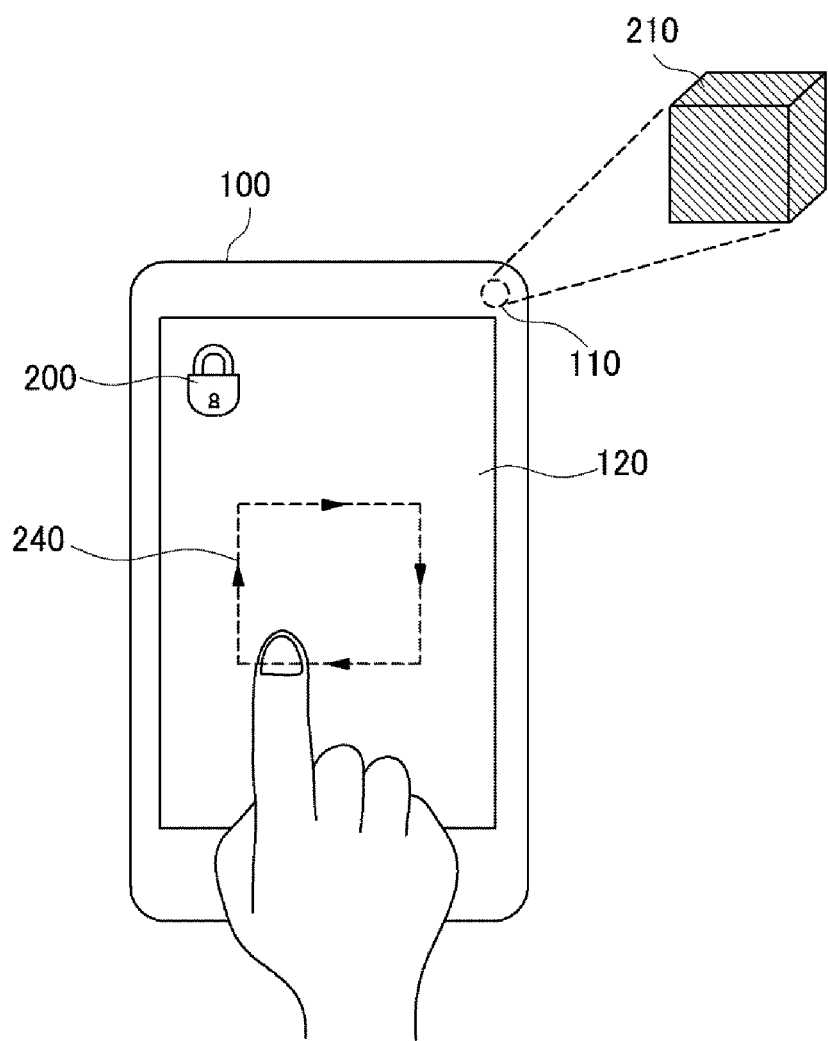
FIG. 3 schematically shows another illustrative example of performing an unlocking scheme on the end device of FIG. 1.

FIG. 3 schematically shows another illustrative example of performing an unlocking scheme on the end device of FIG. 1. As illustrated in FIG. 3, end device 100 as illustrated in FIG. 1 is in a lock state and lock state image 200 may be displayed on touch screen 120 of end device 100. Camera 110 of end device 100 may capture an image of object 210. The captured image of object 210 may be displayed on touch screen 120 for a predetermined time and, then, removed from touch screen 120. That is, in order to prevent another person from viewing the capture image, the captured image of object 210 may not be displayed on touch screen 120 after the predetermined time, and this state is illustrated in FIG. 3.

The user of end device 100 may make a touch input to touch screen 120 after the captured image of object 210 is removed from touch screen 120. Processor 140 of end device 100 may recognize trace 240 of the touch input. Further, processor 140 may detect a boundary of object 210 from the captured image. Then, processor 140 may calculate a similarity between trace 240 of the touch input and the boundary of object 210. For example, processor 140 may calculate each area of trace 240 of the touch input and the boundary of object 210, and then, compare the area of trace 240 of the touch input with the area of the boundary of object 210. Processor 140 may determine whether the calculated similarity is the same as or higher than a predetermined value. If the calculated similarity is the same as or higher than the predetermined value, processor 140 may determine to unlock end device 100.

In the above description regarding FIGS. 2 and 3, although processor 140 has been described to determine to unlock end device 100 based on the similarity (which corresponds to the above described first similarity) between trace 240 of the touch input and boundary 230 of object 210 included in the currently captured image 220, it will be apparent to those skilled in the art that for enhancing securities for end device 100, processor 140 may determine to unlock end device 100 further based on at least one of the above described second similarity, third similarity, fourth similarity and fifth similarity.

Figure 4:
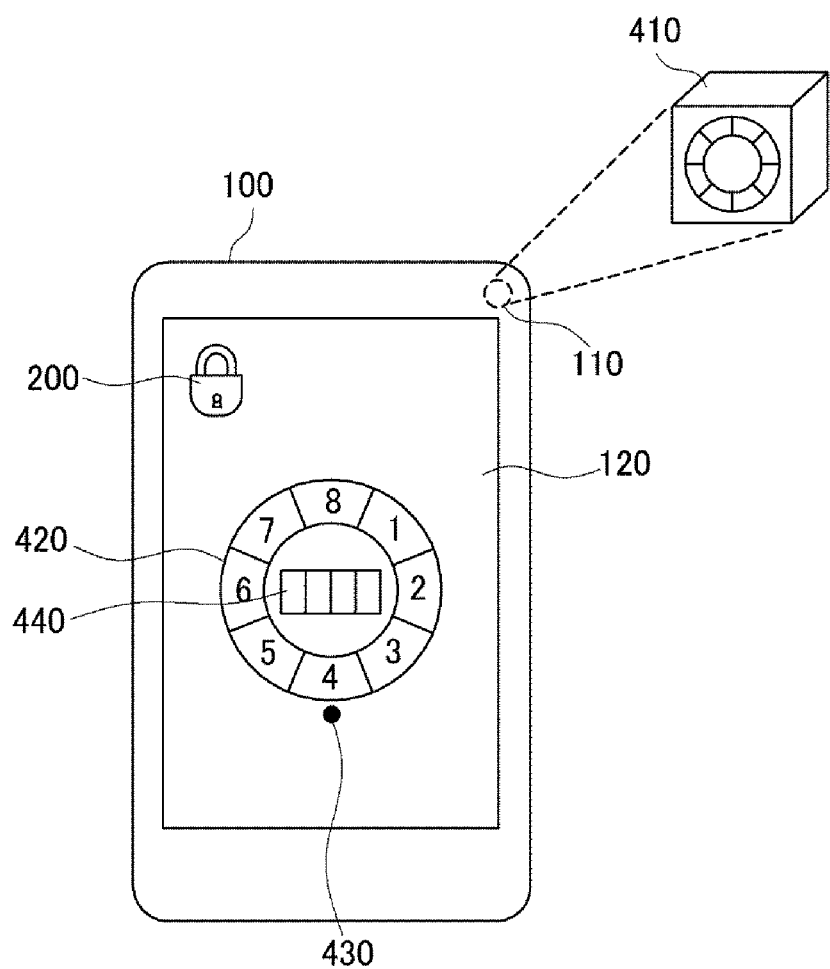
FIG. 4 schematically shows another illustrative example of performing an unlocking scheme on the end device of FIG. 1.

FIG. 4 schematically shows another illustrative example of performing an unlocking scheme on the end device of FIG. 1. As illustrated in FIG. 4, end device 100 as illustrated in FIG. 1 is in a lock state and lock state image 200 may be displayed on touch screen 120 of end device 100. Camera 110 of end device 100 may capture an image of an object 410 such as, not limited thereto, a safe including multiple numerals. Processor 140 of end device 100 may display a numeral image 420 including multiple numerals. Processor 140 may select one numeral image 420 from among multiple numeral images stored in memory 130 depending on a kind of object 410. By way of example, but not limited to, if object 410 is a safe, processor 140 may select numeral image 420 which is a safe dial image.

In the above description regarding FIG. 4, although the captured image of object 410 is not illustrated on touch screen 120, in some embodiments, the captured image of object 410 may be displayed on touch screen 120 and numeral image 420 may be overlaid on the captured image. Further, in some embodiments, processor 140 may generate an augmented reality image of numeral image 420 and display the generated augmented reality image of numeral image 420 on touch screen 120.

Figure 5A:
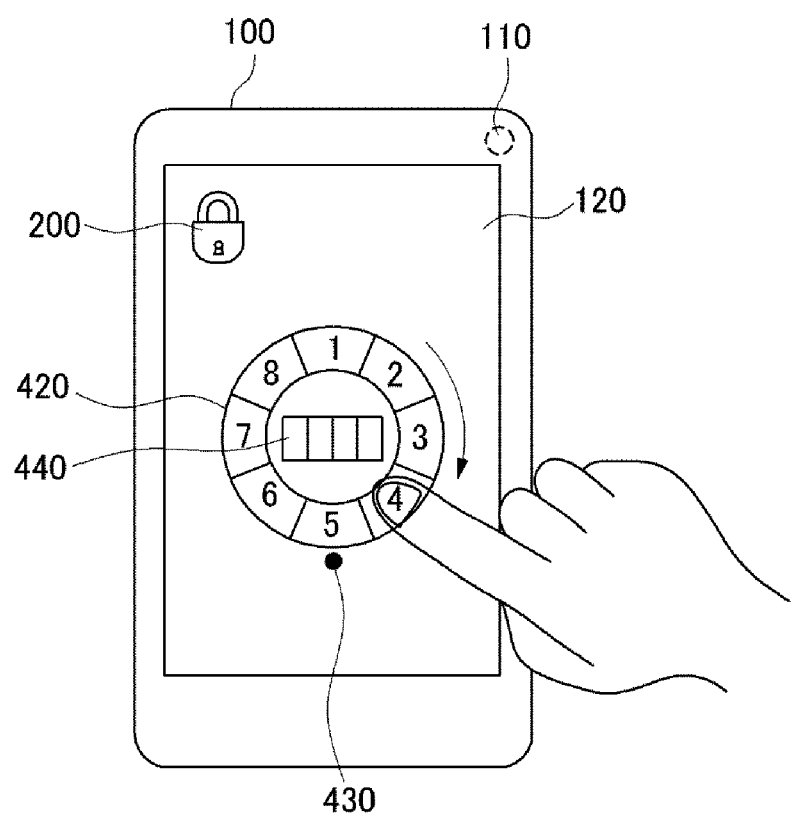
FIGS. 5A to 5C schematically show illustrative examples of performing an unlocking scheme on the end device of FIG. 4.
Figure 5B:
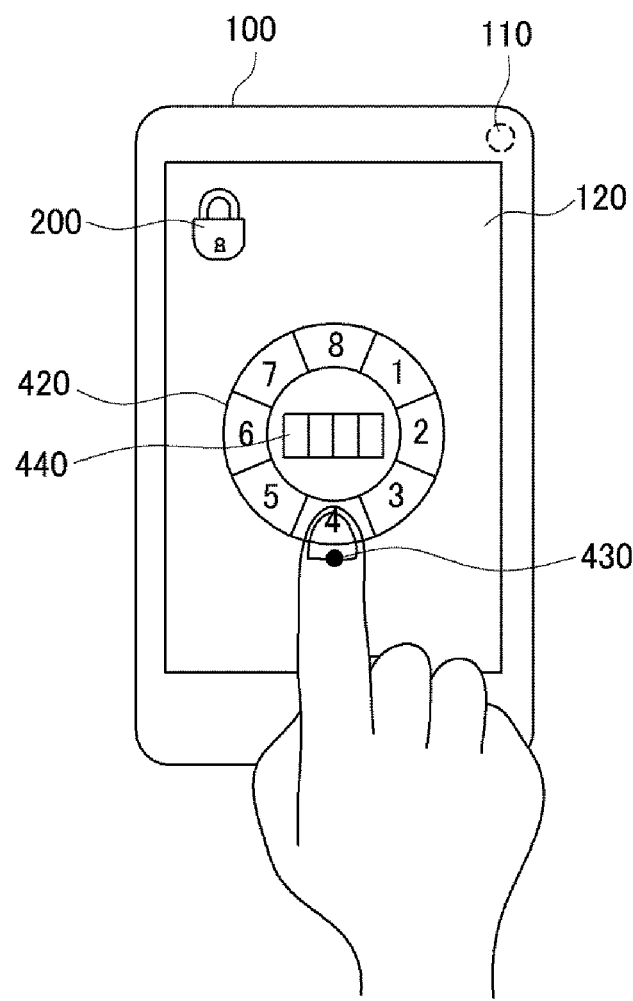
Figure 5C:
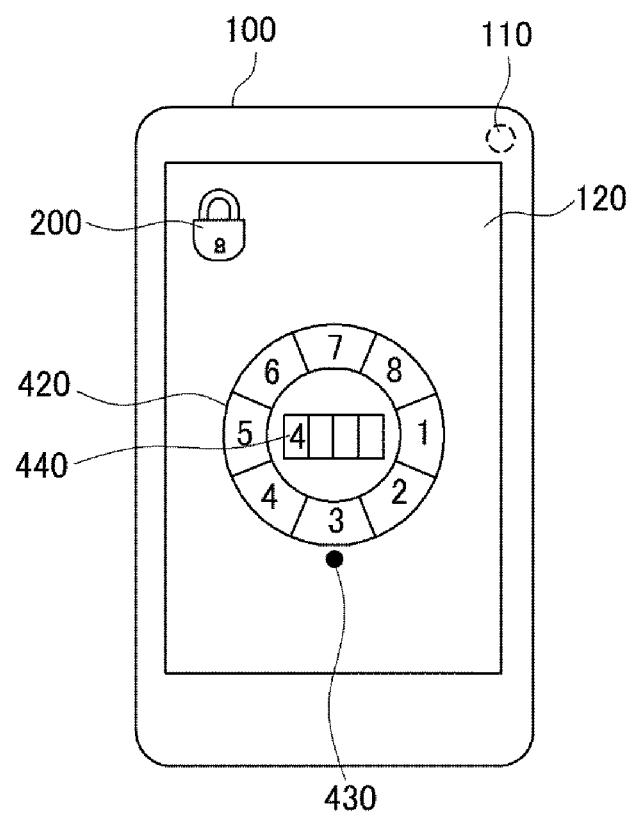

FIGS. 5A to 5C schematically show illustrative examples of performing an unlocking scheme on the end device of FIG. 4. As illustrated in FIG. 5A, a user may touch a numeral "4" included in numeral image 420 and drag the touched numeral. In some embodiments, processor 140 may recognize the numeral selected by the touch by using any one of well-known character reading schemes. Alternatively, in some other embodiments, each position of each numeral included in numeral image 420 on touch screen 120 is previously determined. Processor 140 may detect the position of the selected numeral, and then, recognize the selected numeral based on the detected position of the selected numeral. By way of example, but not limited to, the user may select a numeral "4" on numeral image 420 and start to drag to rotate numeral image 420 clockwise (illustrated by an arrow in FIG. 5A). Processor 140 may recognize that the numeral "4" is selected by the touch input.

As illustrated in FIG. 5B, the user may drag the numeral "4" to a determining point 430. Then, processor 140 may determine the numeral "4" dragged to the determining point 430 as an input number.

As illustrated in FIG. 5C, processor 140 may display the determined input number on an input number display section 440. By way of example, but not limited to, processor 140 may display the numeral "4" on input number display section 440.

By using the above-described method with reference to FIGS. 5A to 5C, processor 140 may recognize multiple numerals selected by the user as input numbers and display the multiple input numbers on input number display section 440. Processor 140 may determine whether the recognized numerals as input numbers are identical to a password stored in memory 130. If the recognized numerals are identical to the password, processor 140 may determine to unlock end device 100.

Figure 6:
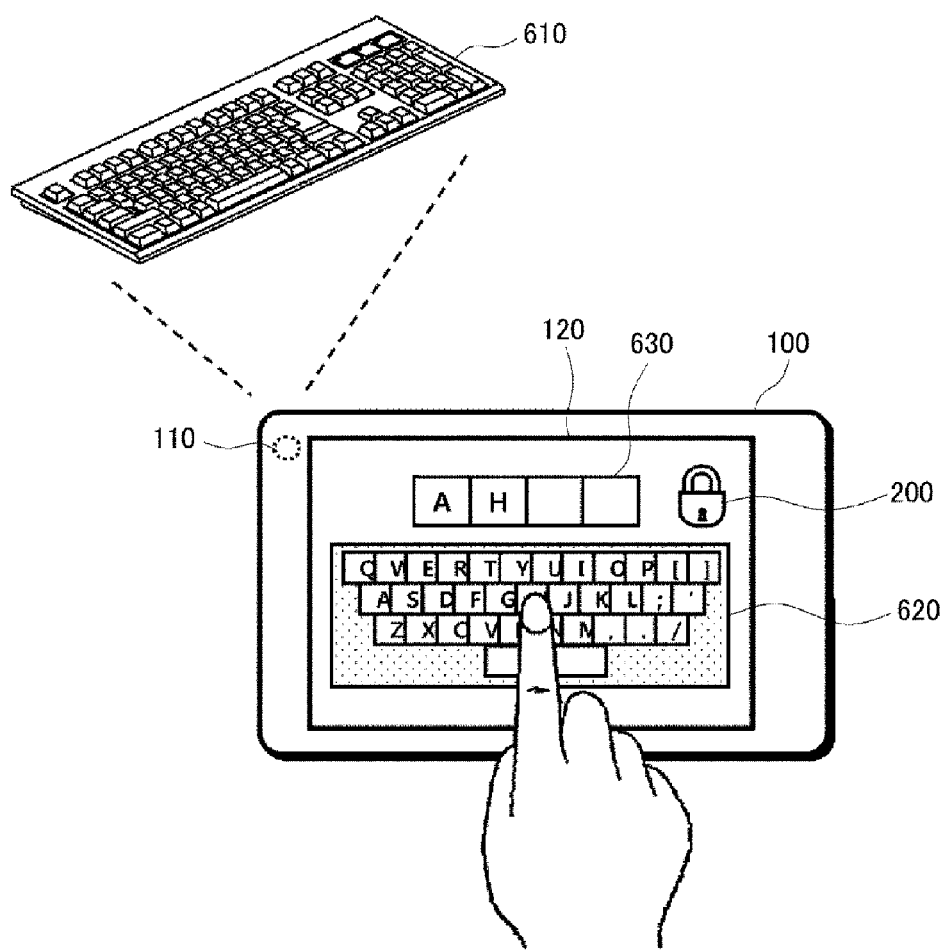
FIG. 6 schematically shows another illustrative example of performing an unlocking scheme on the end device of FIG. 1.

FIG. 6 schematically shows another illustrative example of performing an unlocking scheme on the end device of FIG. 1. As illustrated in FIG. 6, end device 100 as illustrated in FIG. 1 is in a lock state and lock state image 200 may be displayed on touch screen 120 of end device 100. Camera 110 of end device 100 may capture an image 620 of an object 610 such as, not limited thereto, a keyboard including at least one character. Captured image 620 of object 610 may be displayed on touch screen 120 of end device 100.

A user of end device 100 may select at least one character by touching the at least one character included in captured image 620 displayed on touch screen 120. By way of example, but not limited to, processor 140 may read the selected character on captured image 620 by using any one of well-known character reading schemes. Processor 140 may determine whether the at least one selected character is identical to a password stored in memory 130. If the at least one selected character is identical to the password, processor 140 may determine to unlock end device 100.

In the above description regarding FIG. 6, although it has been described that captured image 620 displayed on touch screen 120 includes at least one character and the user touches the captured image 620, in some embodiments, processor 140 may generate an augmented reality image of a character image including at least one character and display the generated augmented reality image of the character image on touch screen 120, and then, the user may touches the augmented reality image of the character image.

Figure 7:
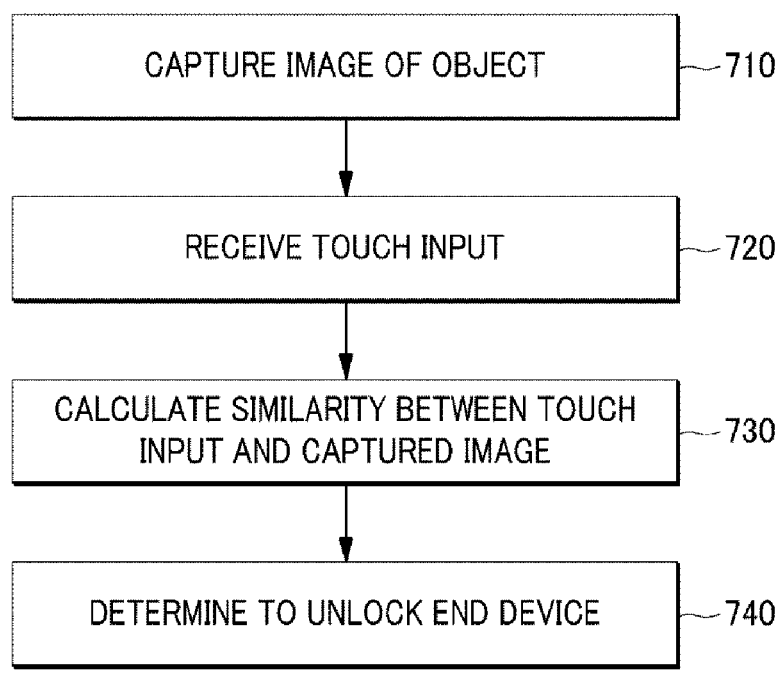
FIG. 7 shows an example processing flow for unlocking an end device.

FIG. 7 shows an example processing flow for unlocking an end device. The process in FIG. 7 may be implemented by end device 100 illustrated in FIG. 1. An example process may include one or more operations, actions, or functions as illustrated by one or more blocks 710, 720, 730, and/or 740. Although illustrated as discrete blocks, various blocks may be divided into additional blocks, combined into fewer blocks, or eliminated, depending on the desired implementation. Processing may begin at block 710.

At block 710 (Capture Image of Object), end device 100 may capture an image of an object. The captured image of the object may be displayed on touch screen 120. Alternatively, the captured image of the object may be displayed on touch screen 120 for a predetermined time and then, removed from touch screen 120. Processing may proceed from block 710 to block 720.

At block 720 (Receive Touch Input), end device 100 may receive a touch input to touch screen 120 from a user of end device 100. End device 100 may receive the touch input while the captured image of the object is displayed on touch screen 120. Alternatively, end device 100 may receive touch input after the captured image of the object is removed from touch screen 120. Processing may proceed from block 720 to block 730.

At block 730 (Calculate Similarity between Touch Input and Captured Image), end device 100 may calculate a similarity between the received touch input and the captured image of the object. In some embodiments, end device 100 may recognize a trace of the touch input received at block 720. Further, end device 100 may detect a boundary of the object from the image of the object captured at block 710. Then, end device 100 may calculate a similarity between the trace of the touch input and the boundary of the object.

At block 740 (Determine to Unlock End Device), end device 100 may determine to unlock end device 100 based, at least in part, on the image of the object and the touch input. In some embodiments, end device 100 may compare the similarity calculated at block 730 with a predetermined value. If the calculated similarity is the same as or higher than the predetermined value, end device 100 may determine to unlock end device 100.

The examples described above, with regard to FIGS. 1-7, may be implemented in a computing environment having components that include, but are not limited to, one or more processors, system memory, and a system bus that couples various system components. Further, the computing environment may include a variety of computer readable media that are accessible by any of the various components, and includes both volatile and non-volatile media, removable and non-removable media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, but not limitation, computer readable media may comprise computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal, such as carrier wave or other transport mechanism. Communication media also includes any information delivery media. The term modulated data signal means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

What is claimed is:

1. An end device, comprising:
   a camera configured to capture an image of an object;
   a touch screen configured to receive a touch input; and
   a processor configured to determine to unlock the end device based, at least in part, on the image of the object and the touch input,
   wherein the processor comprises:
   a touch input recognition unit configured to recognize a trace of the touch input;
   a boundary detection unit configured to detect a first boundary of the object from the image of the object;
   a similarity calculation unit configured to calculate a first similarity between the trace of the touch input and the first boundary of the object; and
   a control unit configured to determine to unlock the end device based, at least in part, on the first similarity.

2. The end device of claim 1, wherein the captured image is displayed on the touch screen, and
   the touch input is received while the captured image is displayed on the touch screen.

3. The end device of claim 1, wherein the captured image is displayed on the touch screen for a predetermined time and, then, the displayed image is removed from the touch screen, and
   the touch input is received after the displayed image is removed from the touch screen.

4. The end device of claim 1, further comprising:
   a memory configured to store at least one image of the object,
   wherein the boundary detection unit is further configured to detect a second boundary of the object from the at least one image stored in the memory,
   the similarity calculation unit is further configured to calculate a second similarity between the first boundary and the second boundary, and
   the control unit determines to unlock the end device further based, at least in part, on the second similarity.

5. The end device of claim 4, wherein the processor comprises:
   a texture recognition unit configured to recognize a first texture of the object from the captured image and a second texture of the object from the at least one image stored in the memory,
   wherein the similarity calculation unit is further configured to calculate a third similarity between the first texture and the second texture, and
   the control unit determines to unlock the end device further based, at least in part, on the third similarity.

6. The end device of claim 5, wherein each of the first texture and the second texture includes at least one of a color of the object and a pattern of the object.

7. The end device of claim 1, further comprising:
a memory configured to store an information regarding an unlock permission location,
wherein the processor comprises:
a location information obtaining unit configured to obtain a location information of the end device, and
wherein the processor determines to unlock the end device further based, at least in part, on the location information of the end device and the information regarding the unlock permission location.

8. The end device of claim of 7, wherein the processor determines to unlock the end device if the location information of the end device falls within a tolerance range from the unlock permission location.

9. The end device of claim 1, further comprising:
a memory configured to store a password,
wherein the processor comprises:
a numeral image display unit configured to display, on the touch screen, a numeral image including a plurality of numerals; and
a numeral recognition unit configured to recognize, based at least in part on the touch input, at least one numeral selected on the numeral image,
wherein the control unit is further configured to determine whether the at least one recognized numeral is identical to the password and determine to unlock the end device.

10. The end device of claim 9, wherein the captured image of the object is displayed on the touch screen, and
the numeral image is overlaid on the captured image.

11. The end device of claim 9, wherein the numeral image display unit is further configured to select the numeral image from among a plurality of numeral images depending on a kind of the object.

12. The end device of claim 9, wherein the object has thereon at least one numeral, and
the numeral image is generated based on the captured image of the object.

13. The end device of claim 1, wherein the captured image includes at least one character, and
the end device further comprises:
a memory configured to store a password,
wherein the processor comprises:
a character reader configured to read at least one character selected on the captured image, and
wherein the control unit is further configured to determine whether the at least one character read by the character reader is identical to the password and determine to unlock the end device.

14. The end device of claim 13, wherein the captured image includes a keyboard image.

15. An end device, comprising:
a camera configured to capture an image of an object;
a touch screen configured to receive a touch input; and
a processor configured to determine to unlock the end device based, at least in part, on the image of the object and the touch input; and
a memory configured to store at least one image of the object and at least one touch input associated with the object,
wherein the processor comprises:
a similarity calculation unit configured to calculate a fourth similarity between the received touch input and the at least one touch input stored in the memory and a fifth similarity between the captured image and the at least one image stored in the memory; and
a control unit configured to determine to unlock the end device based, at least in part, on the fourth similarity and the fifth similarity.

16. The end device of claim 15, wherein the similarity calculation unit calculates the fourth similarity based, at least in part, on a trace of the received touch input and a trace of the at least one touch input stored in the memory, and
the similarity calculation unit calculates the fifth similarity based, at least in part, on a texture of the object.

17. A method performed under control of an end device, comprising:
capturing an image of an object;
receiving a touch input; and
determining to unlock the end device based, at least in part, on the image of the object and the touch input,
wherein the determining to unlock the end device comprises:
recognizing a trace of the touch input;
detecting a first boundary of the object from the image of the object;
calculating a first similarity between the trace of the touch input and the first boundary of the object; and
determining to unlock the end device based, at least in part, on the first similarity.

18. A method of providing computer-executable instructions that cause an end device to perform the method of claim 17.

19. A non-transitory computer-readable storage medium having stored thereon computer-executable instructions that, in response to execution, cause an end device to perform operations, comprising:
capturing an image of an object;
receiving a touch input; and
determining to unlock the end device based, at least in part, on the image of the object and the touch input,
wherein the determining to unlock the end device comprises:
recognizing a trace of the touch input;
detecting a first boundary of the object from the image of the object;
calculating a first similarity between the trace of the touch input and the first boundary of the object; and
determining to unlock the end device based, at least in part, on the first similarity.

* * * * *